(12) United States Patent
Mientkewitz et al.

(10) Patent No.: US 8,097,318 B2
(45) Date of Patent: Jan. 17, 2012

(54) GLASS-METAL CONNECTION, IN PARTICULAR FOR A VACUUM-TUBE SOLAR COLLECTOR

(75) Inventors: Gerhard Mientkewitz, Freiberg (DE); Wilfried Schaffrath, Dorfhain (DE); Tobias Köhler, Brand-Erbisdorf (DE)

(73) Assignee: NARVA Lichtquellen GmbH + Co. KG, Brand-Erbisdorf (DE)

( * ) Notice: Subject to any disclaimer, the term of this patent is extended or adjusted under 35 U.S.C. 154(b) by 893 days.

(21) Appl. No.: 11/992,333

(22) PCT Filed: Jul. 13, 2006

(86) PCT No.: PCT/DE2006/001244
§ 371 (c)(1),
(2), (4) Date: Mar. 20, 2008

(87) PCT Pub. No.: WO2007/033630
PCT Pub. Date: Mar. 29, 2007

(65) Prior Publication Data
US 2009/0117299 A1   May 7, 2009

(30) Foreign Application Priority Data

Sep. 20, 2005 (DE) .................. 20 2005 014 826 U
Sep. 20, 2005 (DE) .................. 20 2005 014 828 U
Sep. 20, 2005 (DE) .................. 20 2005 014 831 U

(51) Int. Cl.
*B32B 1/08* (2006.01)
*F16L 9/10* (2006.01)
(52) U.S. Cl. ............. 428/36.9; 428/34.1; 428/34.4
(58) Field of Classification Search ............ 428/34.1, 428/34.4, 34.6, 36.9; 126/569–713
See application file for complete search history.

(56) References Cited

U.S. PATENT DOCUMENTS 3,762,302 A * 10/1973 Piot .................................. 454/47
4,231,353 A    11/1980 Kanatani et al.
5,727,585 A     3/1998 Daume et al.
(Continued)

FOREIGN PATENT DOCUMENTS

DE          973 105         12/1959
(Continued)

OTHER PUBLICATIONS

Zincke, Alfred, "Technologie Der Glasverschmelzungen," Leipzig, 1961, Akademische Verlagsgesellschaft Geest & Portig, K. G., pp. 36-53. (Spec, p. 2).
Espe et al., "Werkstoffkunde Hochvakuumtechnik," Berlin, Verlag von Julius Springer, 1936, pp. 322-354. (Spec, p. 3).
(Continued)

*Primary Examiner* — Walter B Aughenbaugh
(74) *Attorney, Agent, or Firm* — Collard & Roe, P.C.

(57) ABSTRACT

The invention relates to a glass-metal connection, in particular for a vacuum-tube solar collector, comprising a metallic connecting part (1), which connects a heat recovery tube (3) and a enclosing tube (2) of glass in a vacuum-tight manner, one end (5) of the enclosing tube (2) being inwardly deformed in a flange-like manner in such a way that it encloses an outer edge portion (7) of the metallic connecting part (1) in a vacuum-tight manner on both sides by fusing. This edge portion (7) is expediently formed in a rotationally symmetrical manner and/or the enclosing tube (2) is produced from a soda-lime glass. The connecting part (1) is connected in a vacuum-tight manner to one or more heat recovery tubes (3). The connecting part (1) and the glass of the enclosing tube (2) have approximately the same coefficient of expansion.

7 Claims, 1 Drawing Sheet

U.S. PATENT DOCUMENTS

Figure 1:
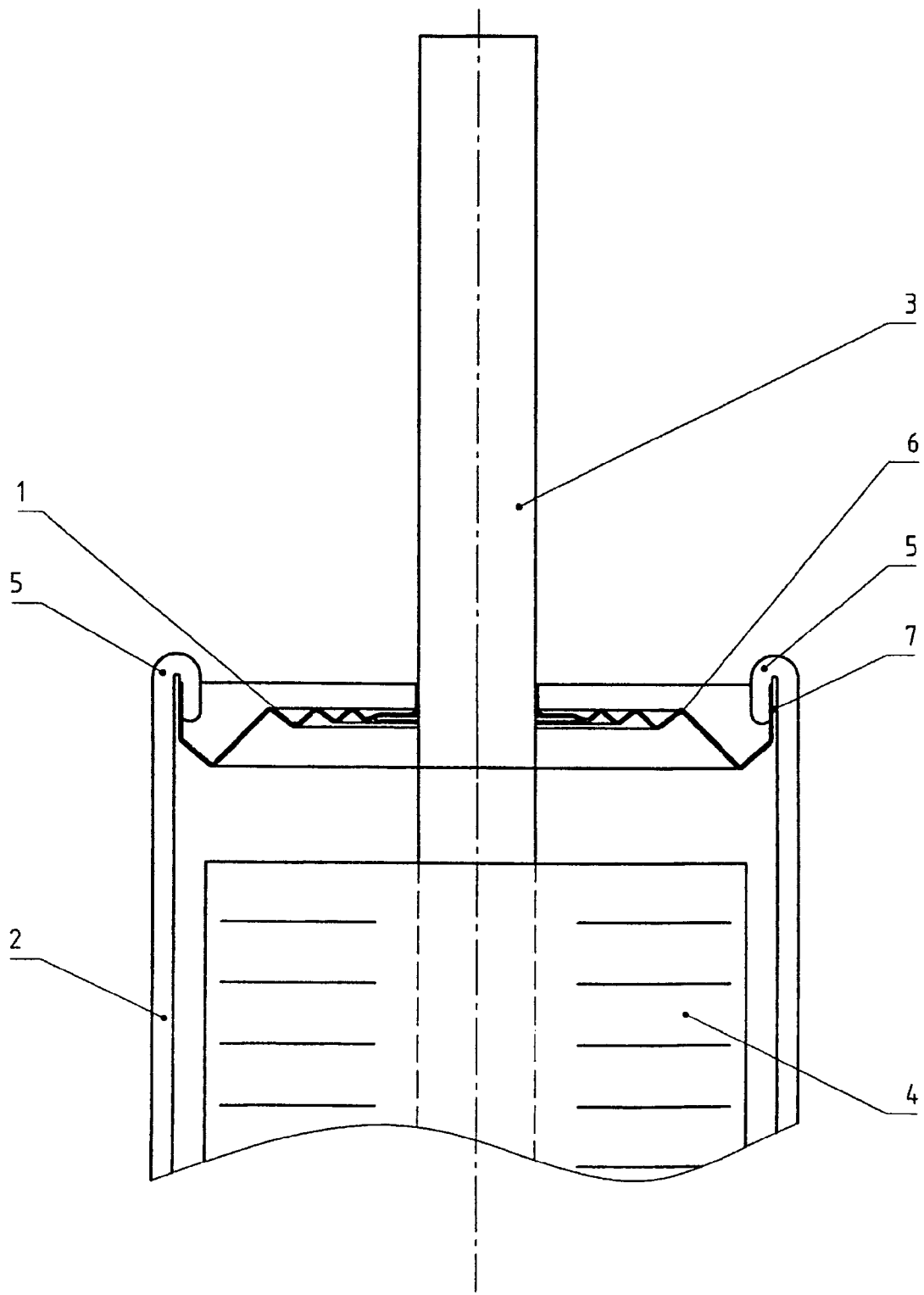

2005/0181925 A1 8/2005 Kuckelkorn et al.

FOREIGN PATENT DOCUMENTS

| DE | 44 22 755 | 1/1996 |
|---|---|---|
| GB | 222 510 | 10/1925 |
| GB | 452 558 | 8/1936 |
| JP | 59-180237 | 10/1984 |

OTHER PUBLICATIONS

Zincke, Alfred, "Technologie Der Glasverschmelzungen," Leipzig, 1961, Akademische Verlagsgesellschaft Geest & Portig, K. G., pp. 36-53. (Spec, p. 2) (With English translation of relevant paragraphs).

International Search Report —mailed. Nov. 15, 2006—WA.

* cited by examiner

GLASS-METAL CONNECTION, IN PARTICULAR FOR A VACUUM-TUBE SOLAR COLLECTOR

CROSS REFERENCE TO RELATED APPLICATIONS

This application is the National Stage of PCT/DE2006/001244 filed on Jul. 13, 2006, which claims priority under 35 U.S.C. §119 of German Application No. 20 2005 014 828.8 filed on Sep. 20, 2005, German Application No. 20 2005 014 826.1 filed Sep. 20, 2005, and German Application No. 20 2005 014 831.8 filed Sep. 20, 2005. The international application under PCT article 21(2) was not published in English.

The invention related to a glass-metal connection with a tube of inorganic glass, which is especially well-suited for a vacuum-tube solar collector.

In such vacuum-tube solar collectors a surface which absorbs the solar rays is placed inside the evacuated tube; the surface is thermally connected with the tube or multiple tubes by means of a suitable jointing technology. This tube or the tubes serve to transport the solar heat absorbed by means of a liquid acting as the heat-transfer medium. Both ends of the tube must be sealed air-tight.

In general the one end of the tube is sealed by melting the glass so that it is air-tight.

It is known that the other end of the tube is sealed air-tight with a glass-metal connection whereby one or more heat output tubes project out through the metal connector and are connected with this by either solder or welded connections. The outer edge of the glass-metal connection of the vacuum-tube solar collector forms a n air-tight connection with the glass tube. The metal connector and the air-tight connection at the outer edge of the connector jointly form the glass-metal connection.

The technical problem of a vacuum-sealed connection between glass and metal is that the expansion coefficients of glass and metal vary considerably and that stress cracks may result with changes in temperatures and the vacuum may be lost.

There are a number of technical designs for solving this problem.

According to "Werkstoffkunde der Hochvakuumtechnik", Berlin, Verlag Julius Springer, 1936, solutions are known in which the glass-metal connections for glasses with very low expansion coefficients such as quartz or borosilicate glasses are produced wherein a series of intermediate glasses with increasing expansion coefficients are melted onto one another so that the difference of the expansion coefficients between the various melted glasses is such that it does not exceed a certain degree. When the expansion coefficient difference to metal is small enough, the metal is melted onto the last glass part.

The disadvantage of this solution is that it is complicated and the amount of effort required for melting the intermediate glass (overlapping straw). Such a process cannot, for all practical purposes, be automated.

US 2005/0181925A1 describes a technical solution in which the goal is to allow for an automated production technology. With this solution a metal alloy with expansion coefficients for two different borosilicate glasses that have expansion coefficients of 5 E-6/K and with which a tube fusing is possible, whereby the glass tube is melted, vacuum-sealed, with a metal tube in which the thin-walled metal tube is submerged axially into the edge of the thick-walled glass tube.

A disadvantage is that the proposed solution is very energy-intensive and suited for borosilicate glasses made of expensive raw materials and the production of the glass-metal connection is a multi-staged process because the metal tube has to be connected, vacuum-sealed, from its end via a connective piece with the heat output tube.

So-called tube-fusing of metal tubes to glass tubes is known from "Technologie der Glasverschmelzungen" Leipzig 1961, Akademische Verlagsgesellschaft Geest & Portig KG. The two tube fusions have the axial penetration of the metal tube in the heated glass edge or unilateray fusion in common. If there is a major difference in the expansion coefficients between the metal and glass, the metal is shaped like a knife-edge. The thickness of the metal knife-edge, the angle of the knife-edge and the width of the fusions depend on the diameter of the vacuum-sealed metal tube to be fused and are not revealed for copper tubes in the paper mentioned above.

One problem of the solution is the relatively difficult preparation for cutting and that the axial penetration of the blade is technologically poor for many glass-metal connectors because with larger tube diameters this can only be controlled with great effort and therefore it is usual that a glass part which equals out the diameter must be placed in between. Another disadvantage is that glass-metal connections for these solutions are very susceptible to breakage.

U.S. Pat. No. 4,231,353 reveals a solution in which one or two rotation-symmetrical metallic covers surrounding the evacuated tubes are formed in such a manner that it meshes with the vacuum-tube solar collector's glass evacuated tube made of calcium-sodium bicarbonate in ring-shaped channels on the outside edge of the cover. The evacuated tube is submerged in an initially liquid material, normally lead glass powder, which is melted in the channel and then solidifies there. Consequently, a vacuum-sealed connection between the metal cover and the evacuated tube is produced. The cover is made of an Ni—Cr—Fe alloy. The heat output tube(s) is/are led through the middle of the cover to transfer the heat. The heat output tubes are connected vacuum-sealed with the cover by means of soldering or welding.

The significant process time required for applying and melting the lead-glass powder and the complicated handling of the cover and evacuated tube are disadvantages of this process, meaning that the proposed process can only be automated with considerable technical effort.

In addition glass-metal connections are known on the principles of "Werkstoffkunde der Hochvakuumtechnik", Berlin, Verlag Julius Springer, 1936. Here, too, the vacuum-sealed tubes to be fused are also equipped with the corresponding blades to offset the differing expansions of glass and metal with temperature changes. The disadvantages correspond to those described above.

The task of the invention is therefore to provide a glass-metal connection, especially for a vacuum-tube solar collector which remains vacuum-sealed over a very long period of time, resists the mechanical stresses from thermal expansions, pipe bangs and wind and is easy to manufacture, especially automatically, and is not expensive in material costs.

The task is solved by means of a glass-metal connection in accordance with the invention.

The advantage of the invented glass-metal connection is discussed below.

The invention has the advantage that the glass-metal connection can be easily produced by machine and can therefore be automated and save costs.

The special form of the glass flanging and the shape of the connection piece have in particular the advantage that both their own as well as the weight tension of the glass can be absorbed, which guarantees the connection's vacuum seal over a long period of time, even with significant forces impacting on the tube, e.g. expansion, wind or cavitation.

In the following the invention will be described on the basis of a drawing. It shows FIG. 1. The vacuum-tube solar collector with the invented glass-metal connection partially as a cross-section.

As can be seen in FIG. 1 the collector has the evacuated tube 2 and the heat transfer tube 3 which also carries the absorber sheet metal 4.

The metal connector 1 is connected to the heat output tube 3 air-tight by welding or soldering. Its outer edge 7 is connected with the end 5 of the evacuated tube 2 by means of flanging so that the end 5 of the evacuated tube 2 is shaped from the outside inward over the edge 7 of the connector 1 and this is fused air-tight on both sides.

A ring-shaped pleat 6 around the heat transfer tube 3 serves to strengthen the connector 1. The pleat 6 reinforces the connection element 1 axially to the length of the tube and at the same time serves to absorb forces which act at a right-angle to the heat transfer tube 3. Such a design puts the connector in the position to resist the air pressure without significant distortions. At the same time the pleat 6 also contributes to making the glass-metal transition less encumbered mechanically.

The metal connector 1 has the same or almost the same expansion coefficients as the glass of the evacuated tube 2 of the vacuum-tube solar collector.

To produce the invented glass-metal connection the heat transfer tube 3, which carries the absorber metal 4 and on the end of which the connector 1 is attached airtight with the heat transfer tube is inserted into the evacuated tube 2 so that the glass of the evacuated tube is a few millimeters over the edge of the metal connector 1. Now the glass of the evacuated tube 2 is heated until it is soft so that the glass can be pushed through the inside and outside of the shaping tool to the inner and outer surface of the edge 7 of the connector 1 so that an airtight and mechanically stable fusion as a flange is formed.

For the connector 1 it is preferred that a metal with a low heat conductivity is selected so as to create the least possible thermal stress when fusing the connector 1 with the evacuated tube 2 and the least possible loss of heat.

With the use of a material for the connector 1, which should have an expansion coefficient as close as possible to that of the glass of the evacuated tube, the edge 7 of the connector 1 surrounding the glass should have radius of 0.1 mm.

If the connector 1 is made of a ductile material, e.g. copper, the cutting edge should be of a strength, length and angle as noted in the literature.

An evacuated tube 2 made of lime-natron glass with the following chemical composition (data in mass-%) can be used for the vacuum-tube solar collector

| | |
|---|---|
| $SiO_2$ | 71.41% |
| $Al_2O_3$ | 2.20% |
| $Fe_2O_3$ | 0.03% |
| $TiO_2$ | 0.05% |
| CaO | 4.90% |
| MgO | 3.40% |
| BaO | 0.03% |
| $Na_2O$ | 16.10% |
| $K_2O$ | 1.50% |
| $SO_3$ | 0.30% |

It possesses an expansion coefficient of $(9.8\pm0.2)$ E-6/K.

As initial material for the connector 1 the following alloy has been selected:

| | |
|---|---|
| Ni = 50% | $Cr \leq 25\%$ |
| $Si \leq 0.3\%$ | $Al \leq 0.1\%$ |
| $Mn \leq 0.6\%$ | Fe = Difference to 100% |

The expansion coefficient of the connector 1 is, with this alloy, in the range of the expansion coefficient of the glass of the evacuated tube 2.

Furthermore, the material of the connector 1 has a very low heat conductivity so that the thermal loads on the fusion of the invented glass-metal connection are relatively low, even if the stagnation temperature is reached.

The connector 1 is deep-drawn out of sheet metal with a thickness of ca. 0.2 mm. The section 7 of the connector 1, which will subsequently be surrounded by the end 5 of the evacuated tube 2, is rounded to as to avoid tension in the glass. The radius of this rounding is 0.1 mm. Depending on the type of the subsequent fusing process with the glass of the evacuated tube 2, the connector 1 can be pre-oxidized. Following this pre-treatment the connector 1 is connected, air-tight with the absorber metal 4 bearing heat transfer tube 3, preferably by means of soldering.

After the insertion of the heat transfer tube 3 with absorber metal 4 and the connector 1, in such a way that the evacuated tube 2 sticks out ca. 4 mm, there is a phased or constant heating of the evacuated tube 2 glass until its plasticity is attained. Through a number of steps the glass of the evacuated tube is molded inward with tools so that it has a close with the surrounding section 7 of the connector 1 in a sort of flanging. The connector 1 is then tempered so as to assure the glass of the evacuated tube 2 is free of tension.

According to the special execution of the invention the evacuated tube 2 to improve its anti-reflection effect and its corrosion properties and stability in its inner and/or outer surface in a thickness of 40 nm to 330 nm, preferably 150 nm, covered with one or more layers of nano-particles, preferably out of silicon oxide. These nano-particles have a grain size of 5 nm to 50 nm, preferably 12 nm.

The covering of the evacuated tube can be made through a single or multiple immersions and slowly withdrawing the tube out of a suspension containing $SiO_2$, a bonding agent, a wetting agent and a dispersion agent such as deionized water. After it is withdrawn the coatings on the inside and outside surfaces are air dried and then tempered at a temperature of ca. 450° C.

Although a specific execution of the invention has been shown and described for the explanation, the invention is not limited to the execution as presented. The invention consists of all the executions and modifications of the application of glass-metal connections, especially for vacuum-sealed vessels which are within the protective scope of the claims.

LIST OF REFERENCES
IN ILLUSTRATIONS

| | |
|---|---|
| 1 | Connector |
| 2 | Evacuated tube |
| 3 | Heat transfer tube |
| 4 | Absorber metal |
| 5 | Flanged end |
| 6 | Pleat |
| 7 | End section |

The invention is claimed:

1. A glass-metal connection, with a metallic connector connecting an outbound heat transfer tube and a sheathing made from glass, wherein an end of the sheathing is flanged inwardly so that the end encloses an outer rim of the metallic connector on both sides of the outer rim in a vacuum-tight manner by edge-melting.

2. The glass-metal connection according to claim 1, wherein the metallic connector is connected with a plurality of outbound heat transfer tubes in a vacuum-tight manner.

3. The glass-metal connection according to claim 1, wherein the metallic connector and the glass have an equal linear coefficient of expansion.

4. The glass-metal connection according to claim 3, wherein the linear coefficient of expansion α of the glass of the sheathing amounts to $9.5 \times 10^{-6}$/K to $10.1 \times 10^{-6}$/K.

5. The glass-metal connection according to claim 1, wherein the metallic connector is made of a metal alloy comprising a nickel component in an amount $\geq 50\%$, a manganese component in an amount $\leq 0.6\%$, an aluminum component in an amount $\leq 0.1\%$, a chrome component in an amount $\leq 0.25\%$, a silicon component in an amount $\leq 0.3\%$ and a balance of iron.

6. The glass-metal connection according to claim 1, wherein the outer rim of the metallic connector has a thickness of 0.1 mm to 0.5 mm, and is enclosed over a length of 2 mm to 8 mm by the end of the sheathing in a vacuum-tight manner.

7. The glass-metal connection according to claim 1, wherein on the outer rim of the metallic connector an oxide layer is deposited by thermal treatment or a plurality of thermal treatments before fusing the sheathing.

* * * * *